United States Patent

Schagen et al.

[11] Patent Number: 6,072,492
[45] Date of Patent: *Jun. 6, 2000

[54] SELECTING AN INFORMATION ITEM IN AN INFORMATION PROCESSING SYSTEM

[75] Inventors: Cornelis M. Schagen; Suzan A. Van Delft, both of Eindhoven, Netherlands; Hugo M. H. Paulissen, Hasselt, Belgium

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,370

[22] Filed: Nov. 12, 1997

[30] Foreign Application Priority Data

Dec. 4, 1996 [EP] European Pat. Off. .............. 96203431

[51] Int. Cl.⁷ .............................. G06F 3/14; G06F 15/16
[52] U.S. Cl. ........................ 345/353; 345/356; 345/357; 345/329; 709/217; 709/219
[58] Field of Search ................................... 345/353, 357, 345/356, 329, 332; 395/200.49, 200.47; 707/501; 709/219, 217

[56] References Cited

U.S. PATENT DOCUMENTS

| | | | |
|---|---|---|---|
| 5,485,175 | 1/1996 | Suzuki | 345/353 |
| 5,581,685 | 12/1996 | Sakurai | 345/353 |
| 5,689,668 | 11/1997 | Beaudet et al. | 345/353 |
| 5,704,051 | 12/1997 | Lane et al. | 345/357 |
| 5,708,787 | 1/1998 | Nakano et al. | 345/352 |
| 5,787,417 | 7/1998 | Hargrove | 707/4 |
| 5,801,702 | 9/1998 | Dolan et al. | 345/357 |

OTHER PUBLICATIONS

"CD–Online", Printed by CD–Online Ltd., 2 Percy St., London WIP 9FA. No Date Avail.

*Primary Examiner*—Raymond J. Bayerl
*Assistant Examiner*—Cuong T. Thai
*Attorney, Agent, or Firm*—Gregory L. Thorne

[57] ABSTRACT

An information processing system is programmed to give a user access to a first subset of information items using a first hierarchical multi-level menu-structure on a local work station and to a second such subset using a second such menu-structure on an internet server. The second menu-structure includes at least the sub-menus provided in the first menu-structure. The second information subset includes at least the information items included in the first subset. A user leaving the first menu-structure at a particular sub-menu will enter the second menu-structure in a sub-menu that corresponds to the particular sub-menu. When the user selects to access an information item in the second subset using the second menu, if a current version of the information item is available in the first subset, then unless otherwise specified, the information item in the first subset is accessed as a substitute.

19 Claims, 2 Drawing Sheets

6,072,492

SELECTING AN INFORMATION ITEM IN AN INFORMATION PROCESSING SYSTEM

FIELD OF THE INVENTION

The invention relates to the field of user interfaces in information handling systems.

Method for selecting an information item in an information processing system, system for such a method, local station in such a system, and carrier with program for such a method.

The invention relates to a method for selecting a particular information item from a plurality of information items in an information processing system, which method enables a user to select the particular information item from a first subset of the information items through a first hierarchical multi-level menu-structure and to alternatively select the particular information item from a second subset of the information items.

The invention further relates to a system for enabling a user to select a particular information item from a plurality of information items, which system comprises a first hierarchical multi-level menu-structure for selecting the particular information item from a first subset of the information items and secondary means for selecting the particular information item from a second subset of the information items.

The invention further relates to a local station for enabling a user to select a particular information item from a plurality of information items, which local station comprises a local hierarchical multi-level menu-structure for selecting the particular information item from a local subset of the information items and secondary means for selecting the particular information item from an external subset of the information items.

The invention further relates to a carrier with an executable program to be loaded into such a local station.

It is known to retrieve an information item from a plurality of information items through a hierarchical menu-structure in an information processing system. An information item contains data on a certain subject in one of various ways. For instance, an information item may contain a still image, a textual message, an audio fragment or a video film. Such a method can be applied for various kinds of subjects, e.g. for data on products, data on tourist attractions, for books and the like. In the known method, the user is offered the possibility to retrieve the desired data not only from the subset of information items accessible through the hierarchical menu-structure but also from an additional, second subset of information items. The known method is for instance used in so-called home-shopping applications, where the user has a local station with a local database with product data and where in addition the user is given access to a central station with complementary data like current price and availability of products. The CD-Online system, as described in the brochure 'CD-Online, The Net on your set' provides for a program and an infrastructure for such applications. A drawback of the known method is that the user has to navigate in two sets of information items, each requiring knowledge about the structure and accessing mechanism of the particular subset.

SUMMARY OF THE INVENTION

It is an object of the invention to provide a method of the kind set forth which offers the user an improved accessibility to the information items compared with the known method.

This object is achieved according to the invention in a method that is characterised in that the method further enables the user to proceed from a particular sub-menu in the first menu-structure to a corresponding sub-menu in a second hierarchical multi-level menu-structure for selecting the particular information item from the second subset through the second menu-structure, the second menu-structure at least comprising sub-menus corresponding to the sub-menus of the first menu-structure and the second subset at least comprising the information items of the first subset. The method according to the invention offers the user access to the second subset of information items in a way that is highly similar to the way of access to the first subset of information items. This relieves the cognitive load of the user when navigating between the first and second subset of information items, because initially the user only has to familiarise himself with a single menu-structure that underlies both the first and the second menu-structure. The second menu-structure comprises sub-menus corresponding to the sub-menus of the first menu-structure and therefore offers the user the possibility to leave the first menu-structure and to browse through the second subset of information items, with potentially updated data compared with the first subset, without the risk of getting lost in the second menu-structure. A user who leaves the first menu-structure from a particular sub-menu, will enter the second menu-structure in a sub-menu that corresponds to the particular sub-menu in the first menu-structure, which further helps the user in navigating in the two menu-structures.

An embodiment of the method according to the invention is characterised in that the method further enables the user to return from a particular sub-menu in the second menu-structure to the corresponding sub-menu in the first menu-structure. This offers the user the possibility to return to the first menu-structure, after having consulted the second menu-structure and possibly the second subset of information items. When returning from the second menu-structure to the first menu-structure, it is advantageous to return to that sub-menu in the first menu-structure which corresponds to the sub-menu of the second menu-structure when leaving that menu-structure. This further helps the user in navigating between the two subsets of information items.

An embodiment of the method according to the invention is characterised in that the first menu-structure resides on a local station and that the second menu-structure resides on a central station, to which the local station is connected. The method according to the invention can be applied in a system comprising a local station, with the first menu-structure giving the user access to the first subset of the information items, and a central station, with the second menu-structure giving the user access to the second subset of the information items. The advantage of the application of the method in such a system is that the central station can be employed by many users on different local stations, thereby giving access to the second menu-structure and the second subset of information items to these many users.

An embodiment of the method according to the invention is characterised in that the local station is connected to the central station via Internet. Since Internet is widely available and used by many people, it is advantageous to use Internet as the connection mechanism between the local station and the central station in the method according to the invention.

An embodiment of the method according to the invention is characterised in that upon selecting the particular item from the second subset, it is verified whether the first subset comprises an information item corresponding to the particular information item in the second subset and if such information item is comprised in the first subset then this information item is accessed to substitute for the particular information item. By verifying whether the first subset of the information items comprises an information item corresponding to the particular information, i.e. an information item containing data on the same subject as the particular information item that has been selected by the user from the second subset of information items, a transfer of the data of that information item from the second menu-structure to the first menu-structure can be avoided. The data on that subject can in that case be retrieved from the information item in the first subset. This then avoids the need of sending potentially a lot of data over the network, in the case the method according to the invention is applied for a local station with the first menu-structure and a central station with the second menu-structure. Furthermore, the feature of this embodiment can be used to provide the data of the information items in the first subset in a format that is specifically adapted to the local station, whereas the corresponding data in the second subset is in a general purpose format. When a user wants to retrieve data from an information item in the second subset and the local station determines that a corresponding information item concerning the same subject is locally available in the first subset, then the local station supplies the data from the information item in the first subset instead of the data from the information item in the second subset.

An embodiment of the method according to the invention is characterised in that the second menu-structure allows modification to include a further sub-menu and/or to include an updated information item. The fact that the second menu-structure and/or the second subset of information items can be updated makes it in an easy way possible to supply the user with more recent data. This is because the first menu-structure and the first subset of the information items may remain static, i.e. the structure and items are not updated, while the user gets access to the more recent data through the second menu-structure. This feature is particularly useful, when a number of different users with their individual local stations can be connected to the same central station comprising the second menu-structure and the second subset of information items. Updating the data on this central station will then give all these users access to the more recent data. This updating includes substituting the data referred to by an information item of the second subset and includes the addition or modification of a sub-menu of the second menu-structure.

An embodiment of the method according to the invention is characterised in that the method comprises an initialisation step in which start-up information external to the first menu-structure is retrieved and that the sub-menu according to the start-up information is presented to the user as the first sub-menu. The retrieval of the start-up information, comprising an indication as to what sub-menu has to be presented first to the user, makes it possible that the user enters the first menu-structure in a at that moment most appropriate sub-menu. Furthermore, this mechanism makes it possible to present a different opening sub-menu at different times, thus creating a dynamic, adapting behaviour of the first menu-structure, while it may remain static in its internal composition.

It is a further object of the invention to provide a system of the kind set forth which offers the user an improved accessibility to the information items compared with the known system. This object is achieved according to the invention in a system that is characterised in that the secondary means comprise a second hierarchical multi-level menu-structure for selecting the particular information item from the second subset, the second menu-structure at least comprising sub-menus corresponding to the sub-menus of the first menu-structure and the second subset at least comprising the information items of the first subset, and that the system is arranged for enabling the user to proceed from a particular sub-menu in the first menu-structure to the corresponding sub-menu in the second hierarchical multi-level menu-structure for selecting the particular information item through the second menu-structure. A user in this system is supported in navigating in the two subsets of information items, because the system offers access to the second subset through a second menu-structure that is based on the same structure as the first menu-structure. Further support is offered by the system through the fact that a user, when going from the first menu-structure to the second menu-structure, will enter the second menu-structure in the sub-menu that corresponds to the sub-menu in the first menu-structure in which the user was at the moment of transfer.

An embodiment of the system according to the invention is characterised in that the system comprises a local station containing the first menu-structure and the first subset of the information items, and a central station containing the second menu-structure and the second subset of the information items, the local station being connectable to the central station. In such a system, the central station may be set up to service a plurality of local stations. The central station can be arranged to provide this service for a number of local stations simultaneously. In this embodiment, the second subset of the information items residing on the central station can be accessed by a plurality of different users.

An embodiment of the system according to the invention is characterised in that the system comprises a modification module for modifying the second menu-structure to include a further sub-menu and/or to include an updated information item. Through updating the data in the information items on the central station, all users that connect via their local station to the central station can access the updated data. This constitutes an easy mechanism in the system for providing the users in such a system with more recent data. It is not necessary to update the first subset of information items on all local stations in such a system, but it is sufficient to only update the second subset of information items on the central station.

It is a further object of the invention to provide a local station of the kind set forth which offers the user an improved accessibility to the information items compared with the known local station. This object is achieved according to the invention in a local station that is characterised in that the local station is arranged for enabling the user to proceed from a particular sub-menu in the local menu-structure to a corresponding sub-menu in an external hierarchical multi-level menu-structure for selecting the particular information item from the external subset of the information items through the external menu-structure. The local station according to the invention has the advantage that the user can leave the local menu-structure to enter an external menu-structure in a sub-menu that corresponds to the sub-menu of local menu-structure in which the user was active at the moment of leaving. This eases the navigation of the user in the external menu-structure and reduces the risk of getting lost in that menu-structure.

An embodiment of the local station according to the invention is characterised in that the local station comprises a verification module for, upon selecting the particular item from the external subset by the user, verifying whether the local subset comprises an information item corresponding to the particular information item in the external subset and for, if such information item is comprised in the local subset, accessing this information item to substitute for the particular information item. If the user selects an information item from the external subset and if the verification shows that the local subset contains a corresponding information item, then the data desired by the user can be supplied directly from the local subset and need not to be transferred from the external subset. The avoidance of a potentially long transfer time in such a case is an advantage of the local system according to the invention. A further advantage is that the data in the local subset can be stored in a format that is particularly suitable for the local station, whereas the data stored in the external subset must be stored in a generally applicable format since potentially different types of local station must be able to receive and interpret that data. An example is that the data concerns a still image which is stored in high resolution in the local subset and in a low resolution in the second subset, because the high resolution image would take too much time to be transferred. Another example is that the data constitutes in the local subset a video track in MPEG format and in the external subset a slide show with a number of still images, mimicking a video track, because not all kinds of local stations that are serviced from the external subset can handle MPEG.

An embodiment of the local station according to the invention is characterised in that the local station is arranged to receive start-up information from an external source and to perform an initialisation step for presenting a first sub-menu to the user on the basis of the start-up information so received. Through this mechanism, the local station can offer the user on entrance a first sub-menu that is most appropriate at that time. This can for instance be used to indicate updated data in the external subset of information items. Furthermore, this mechanism can be used to offer the user another opening sub-menu from time to time without modifying the local menu-structure. This is particularly attractive in a situation where the local station is not or not frequently updated. This mechanism for providing another opening sub-menu at different times then offers a dynamic behaviour and avoids that a user gets annoyed by the same opening sub-menu time after time.

It is a further object of the invention to provide a carrier of the kind set forth containing a program which, when loaded into a local apparatus, offers the user an improved accessibility to the information items compared with the known local station. This object is achieved according to the invention in a carrier comprising an executable program to be loaded in a further general purpose apparatus for preparing the apparatus for the execution of the tasks of the local station as described above. Such a carrier could optionally comprise the local subset of the information items, although this subset could be provided to the apparatus in another way.

The above citations are hereby incorporated in whole by reference.

Those skilled in the art will understand the invention and additional objects and advantages of the invention by studying the description of preferred embodiments below with reference to the following drawings which illustrate the features of the appended claims:

BRIEF DESCRIPTION OF THE DRAWINGS

Further embodiments of the invention are recited in the dependent claims.

The invention and its attendant advantages will be further elucidated with the aid of exemplary embodiments and the accompanying schematic drawings, whereby.

Corresponding features in the various Figures are denoted by the same reference symbols.

DETAILED DESCRIPTION OF THE PREFERRED EMBODIMENT

Figure 1:
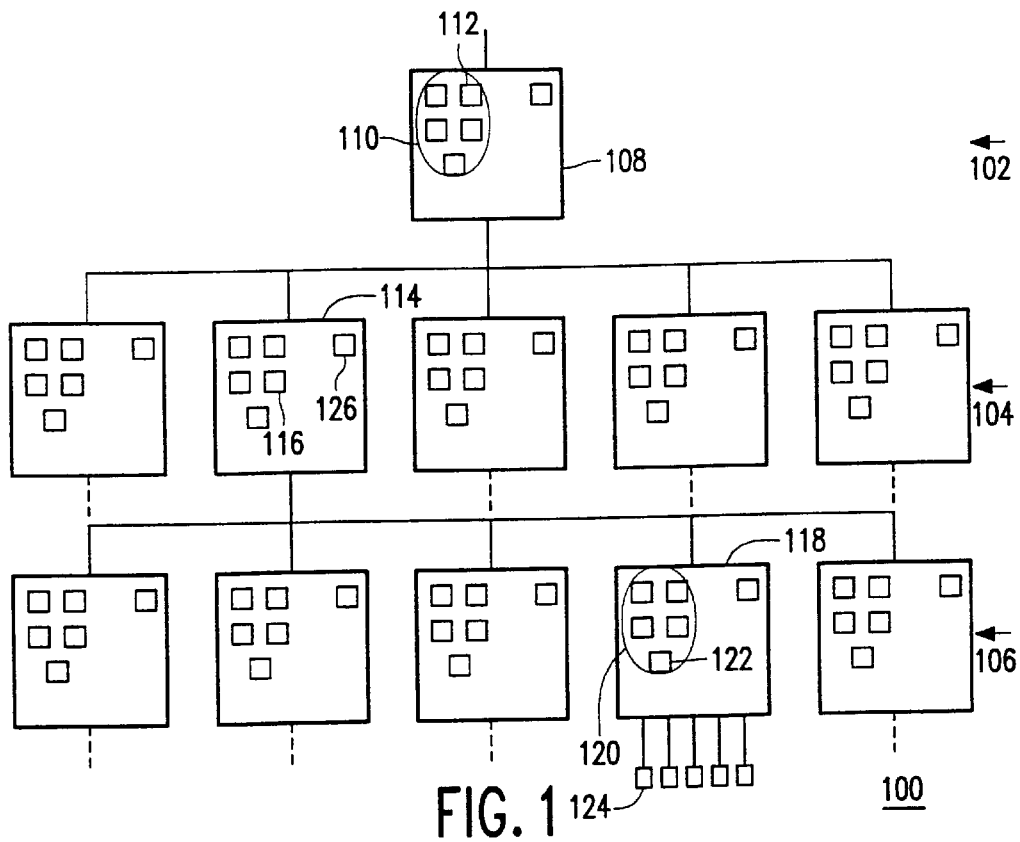
FIG. 1 schematically shows an example of hierarchical menu-structure according to the invention, FIG. 2 schematically shows a transfer from the first to the second menu-structure, FIG. 3 schematically shows a system according to the invention, and FIG. 4 schematically shows a local station according to the invention.

FIG. 1 schematically shows an example of hierarchical menu-structure according to the invention. This menu-structure 100 has a highest level 102, a level 104 one step down, and a lowest level 106 one step further down. Each level has a number of sub-menus giving access to the sub-menus at the next level down. Level 102 has a single sub-menu 108 which gives access to the sub-menus of level 104. To this end, sub-menu 108 has options 110 and selection by a user of a particular option causes the with the particular option corresponding sub-menu at level 104 to be presented to the user. When, for example, a user selects option 112, sub-menu 114 will subsequently be presented to the users. The number of options in a certain sub-menu is equal to the number of sub-menus at its next level down. In the example, sub-menu 108 has five option and level 104 has five corresponding sub-menus. Each of the sub-menus at level 104 has, in the same way as described above, a number of sub-menus that corresponds to its number of options at the next level down. In the example, sub-menu 114 has five sub-menu at level 106. Since this is true for each of the sub-menus at level 104, level 106 has in total 25 distinct sub-menus. At the lowest level, the options of a sub-menu do not give access to a sub-menu at a next level down but give access to a particular piece of data. So the options of a sub-menu at the lowest represent the information items that can be accessed via the menu-structure. In the example, a sub-menu at level 106 has five options, so in total the menu-structure provides access to 125 information items. These 125 information items form the set information items from which a selection can be made through the menu-structure 100. The steps for selecting a particular information item are for instance the following. A user selects option 112 of sub-menu 108 and, as a result of that, sub-menu 114 is presented. The user then selects option 116 of that sub-menu 114 and the corresponding sub-menu 118 is presented to the user. Sub-menu 118 offers the user a choice out of the group 120 of five information items and the user then selects the particular information item 122. After this selection the data 124 can be retrieved.

The example given comprises a hierarchical menu-structure with three levels but application of the invention is not restricted to this particular number of three and an other number of levels is possible. Furthermore, each of the sub-menus of the example comprises five options from which the user can select one particular option. This is not a restriction for the invention and an other number of options in a sub-menu may be used. It is also possible that different sub-menus comprise different numbers of options. A sub-menu with options can be implemented as a display screen with buttons, each having a label with associated text to identify the button. The user then operates a mouse or trackball to point to the desired button and by clicking it. For instance by moving a cursor to the desired button and by subsequently pushing a mouse-button. However the sub-menu can be implemented in a different way, e.g. by presenting a screen with a numbered list with the available options and by letting the user enter the number of the desired options. The actual implementation of the hierarchical menu-structure is not essential to the application of the invention. In addition to the options described above, a sub-menu in the menu-structure according to the invention offers the user a choice to enter a second menu-structure. To this end, such a sub-menu comprises a connection option, for instance connection option 126 in sub-menu 114, through which a user can leave the menu-structure 100 and enters another menu-structure.

Figure 2:
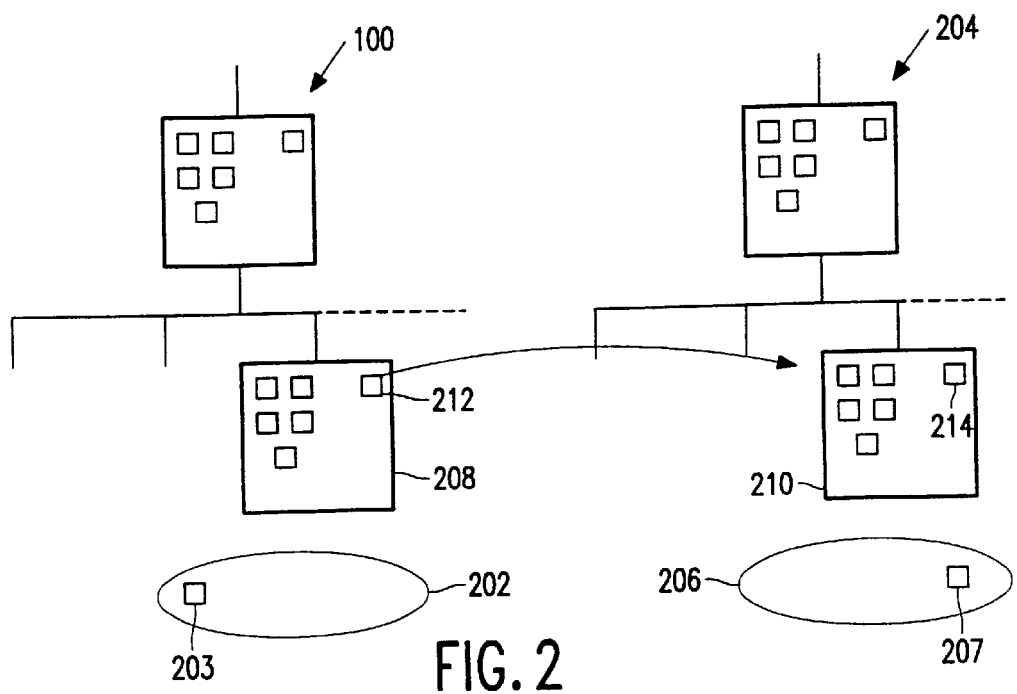

FIG. 2 schematically shows a transfer from the first to the second menu-structure. A first hierarchical multi-level menu-structure 100, as shown in FIG. 1, provides access to a first subset 202 of the information items and a second multi-level menu-structure 204 provides access to a second subset 206 of the information items. The second menu-structure 204 is based on the first menu-structure in that it comprises at least sub-menus that correspond to the respective sub-menus of the first menu-structure. The second menu-structure may comprise additional levels in the hierarchy and may comprise additional options per sub-menu. The only requirement is that a sub-menu in the first menu-structure has a corresponding sub-menu in the second menu-structure. For example the second menu-structure comprises for the sub-menu 208 in the first menu-structure 100 a corresponding sub-menu 210.

The first subset 202 includes a selection of the information items available to the user. A particular information item, like information item 203, contains data on a specific subject and these data can be retrieved for the user after selection of the particular information item. The second subset 206 includes at least the information items that are also included in the first subset 202. A particular information item included in the second subset 206, like information item 207, may contain data that are different from the data contained by the corresponding information item in the first subset. So an information item can be included in both subsets, like an element that is a member of two sets in the mathematical sense, while its data in the two subsets remains distinct. An information item is to be understood as an identification for the data that can be retrieved for a user. An example is an information item that is the Eiffel Tower in Paris, whereby its data in the first subset is a still image in first format (e.g. JPEG) and its data in the second subset is a still image in a second format (e.g. GIF). Then both subsets include the same information item Eiffel Tower, the first subset contains the JPEG image and the second subset contains the GIF image.

Now, a user can select a particular information item through the first menu-structure 100 or through the second menu-structure 204. This can be applied in a system where the first menu-structure and the first subset reside on a local station and the second menu-structure and the second subset reside on a central station. In such an organisation, a user can access the first subset as long as the data in it are sufficient and the user need only connect to the central station if extra data from the second subset are required. These extra data may concern data in addition to the data in the first subset or may concern data that is more recent than in the first subset. The invention is not limited to such a system with a local station and a central station but can also be employed in other systems, e.g. where the first subset forms some kind of cache for the second subset. The second menu-structure embraces the first menu-structure in that the sub-menus of the first menu-structure have corresponding sub-menus in the second menu-structure. This makes it easier for the user to access the second subset because the user does not need to learn a different menu-structure, when switching from the first menu-structure to the second menu-structure. A sub-menu in the first menu-structure comprises a connect option, e.g. option 212 in sub-menu 208, through which a connection is made with the second menu-structure 204 and which takes the user into this second menu-structure. According to the invention, a user enters the second menu-structure 204 in the sub-menu that corresponds to the sub-menu that he left in the first menu-structure. So a user selecting the connect option 212 in sub-menu 208 will enter the second menu-structure in sub-menu 210 because this corresponds to sub-menu 208. This mechanism of entering at the corresponding sub-menu further helps the user in accessing the second subset and further reduces the risk of getting lost in the second menu-structure compared with the situation in which the user is confronted with a completely different method of access entered at an unknown point. This mechanism is realised by identifying the sub-menus in the first menu-structure and by identifying the corresponding sub-menus in the second menu-structure in the same way. In an embodiment, the sub-menu has a code that indicates at which level it is and what is its sequence number at that level and this code is used to access the second menu-structure in the desired, corresponding sub menu.

A sub-menu in the second menu-structure may comprise a return option, like option 214 in sub-menu 210, that provides a return back to the first menu-structure. A user who selects the return option, will leave the second-menu structure and return to the first menu-structure in the corresponding sub-menu. A particular sub-menu in the second menu-structure could concern an additional sub-menu in that it does not have a corresponding sub-menu in the first menu-structure. If the user returns from that particular sub-menu, then it is determined which other sub-menu that has a corresponding sub-menu in the first menu-structure is closest to that particular menu and the user return to that corresponding sub-menu. The closest sub-menu could be determined on the basis that it is on the same level in the hierarchy and nearest in sequence at that level, although other arrangement may be made.

The first and the second menu-structure may be implemented and/or presented in mutually different ways. In an embodiment of the invention, the first menu-structure is implemented in a way dedicated to the local station on which it resides, in this case a CD-i player with a dedicated program running on it. The second menu-structure in this embodiment is implemented in HTML pages on a central station, which can be accessed from the local station via a suitable browser. The usage of HTML, which stands for Hyper Text Markup Language, is well known and widely used on the Internet. An HTML page comprises fields through which other HTML pages can be reached. Such a field is a link to another HTML page, the field having an associated address of that other HTML page, and upon selection of that field the browser will retrieve that other page. In this embodiment of the invention, when a user selects a connection option in a particular sub-menu on the local station, a connection will be made with the central station and the browser will retrieve the HTML page based on the identification of the particular sub-menu.

Figure 3:
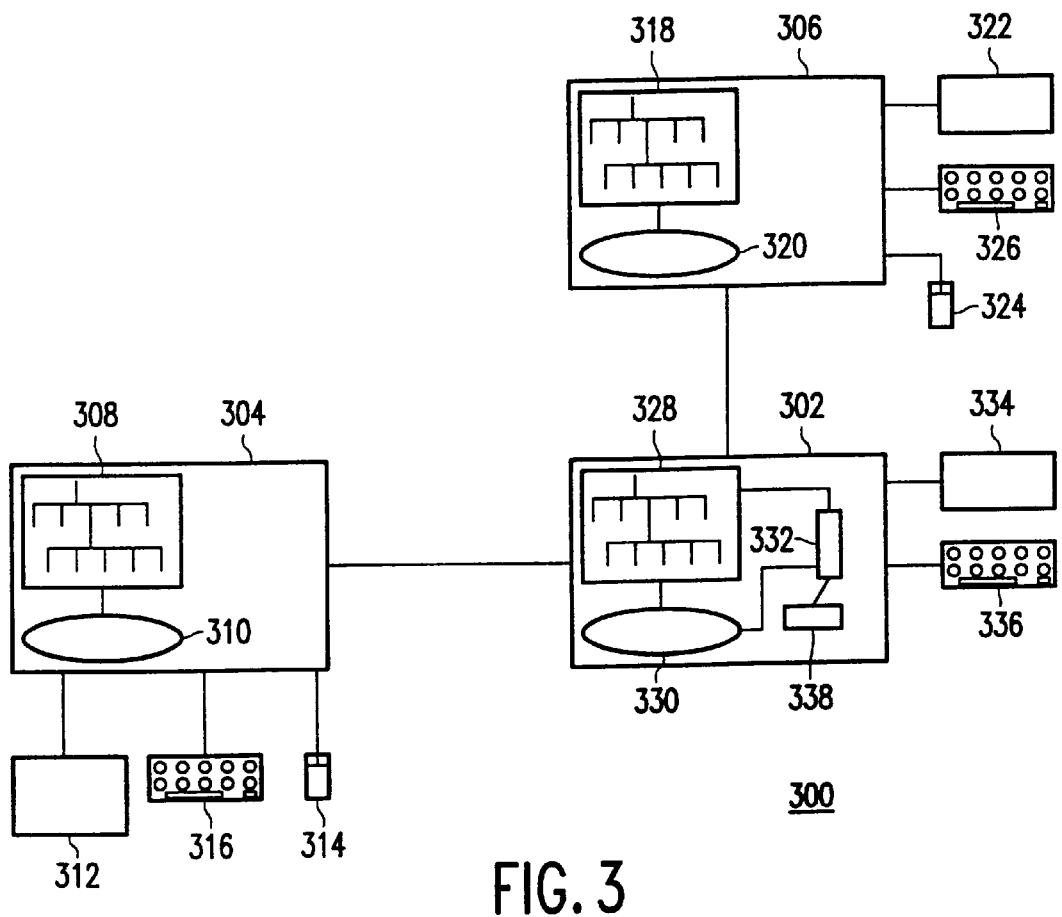

FIG. 3 schematically shows a system according to the invention. A system 300 comprises a central station 302, a local station 304 and a local station 306. The local station 304 comprise a first menu-structure 308 giving access to a first subset 310 of information items. The local station 304 is further equipped with a display screen 312, for displaying the menu-structure and other information, and input devices, for instance a mouse 314 and a keyboard 316, for entering a selection by the user. The local station 304 can be implemented as a dedicated apparatus but could also be implemented on a general purpose apparatus that is programmed to perform the required tasks. It can be implemented on a standard Personal Computer, on a CD-i player, but also on a more powerful workstation. The subset 310 resides on a suitable storage medium, like a hard disk, a CD-ROM or other device, from which information can be retrieved. The local station may comprise further devices that are not shown and not relevant for the present invention. The local station 306 comprises a first menu-structure 318 for accessing a first subset 320, a display screen 322, a mouse 324 and/or a keyboard 326. Also local station 306 can be implemented as a dedicated apparatus or as a general purpose apparatus specially programmed for this system. Local station 304 and local station 306 can be implemented in mutually different ways. The central station 302 comprises a second menu-structure 328 for accessing a second menu-structure 330. This second menu-structure may be stored on a hard disk of the central station. The central station further comprises a modification module 332 for updating the second menu-structure 328 and/or the second subset 330, a display screen 334 and an input device, like keyboard 336. The central station 302 can be implemented on a general purpose computer programmed in a suitable manner to perform the required tasks. The system shown in FIG. 3 comprises two local station by way of example. The system could have only one local station but could also have a larger number of local stations that can be connected to the central station.

The central station optionally comprises start-up information 338, to be retrieved by a local station. This start-up information contains an indication for the local station as to which of the sub-menus should be presented first to the user as an opening sub-menu. The start-up information 338 can be modified by the modification module 332.

An embodiment of the system according to the invention concerns a system for providing information on a city. A program comprising the first menu-structure and the first subset is implemented on a CD-i disk, an optical disk dedicated for a CD-i player, that can be loaded into a CD-i player. The user of the player can consult the subset on the disk and retrieve data that appear of interest. Furthermore, the embodiment comprises an Internet server, with the second menu-structure implemented in HTML pages and the second subset organised as shown in FIG. 2, acting as the central station. The user of the local station can connect to the server to access the second subset for obtaining additional or more recent data than he has locally available. The information on the CD-i disk can be periodically updated and new releases of the CD-i disks distributed. The information on the central station can be updated more frequently and can include additional data compared with the CD-i disk. Stations external to the system can also access the Internet server and consult the information present on the server.

Figure 4:
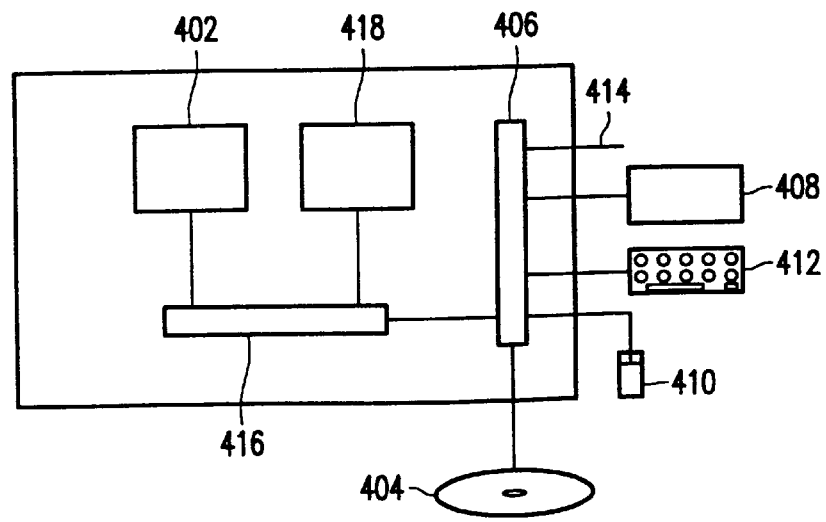

FIG. 4 schematically shows a local station according to the invention. The local station 400 comprises a local menu-structure 402 that gives access to the local subset of information items. This menu-structure is shown in detail in FIG. 1. The local subset resides on a carrier 404, which can be an optical disk, magnetic disk or other suitable storage medium. The carrier 404 can also comprise a copy of the local menu-structure that can be loaded into the station at start-up. The local station has an interface 406 for connecting external devices to the station. These include a display screen 408, a mouse 410 and/or a keyboard 412. Furthermore, the interface 406 provides access to an external station via a connection symbolised by line 414. The connection can be realised in various way, e.g. via the public telephony network or via a computer network like Internet. The local station further comprises a controller 416 to control the tasks of the various other components of the station. A user of the local station 400 can select an information item from the local subset through the local menu-structure 402. In addition, the user can choose to leave the local menu-structure and to proceed in an external menu-structure in a sub-menu that corresponds to the sub-menu where the user left the first menu-structure.

The local station optionally includes a verification module 418, that verifies whether an information item that is selected from an external subset is also present in the local subset. If this is the case, then the data of the information item are retrieved from the local subset instead of from the external subset. This has the advantage of avoiding the potentially time consuming transfer of the data via connection 414. A further advantage is that the data of the information item present in the local subset are in a format that is specifically suitable for the local station, whereas the data present in the external subset must be in a general applicable format. A further option is that the local station 400 retrieves at the beginning of a session start-up information from an external source via connection 414. This start-up information comprises an indication as to what sub-menu should be presented first to the user. In this way, the local source, which may be a central station as described above, can control the way the user enters the first menu-structure. This can be used to draw the user's attention to a particular information item or group of information items, but can also be used to create a dynamic behaviour of the first menu-structure. Even when the carrier is regularly updated, the user will consult the same carrier a number of times and it is advantageous that the system can offer a variation in the opening sub-menus presented to the user.

The local station can be realised as a special apparatus but can also be programmed on a general purpose apparatus. This can be a Personal Computer or a CD-i player in which a program specially developed to this end, can be loaded. The Personal Computer or the CD-i player thus programmed is able to perform the tasks of the local station as described above. In an embodiment of the invention, a CD-i player is employed as local station. The carrier in that case is an optical disk comprising program modules to be loaded into the CD-i player, including the menu-structure, the verification module and a browser for retrieving HTML pages from the Internet server. The carrier further comprises the local subset of information items and the data of those information items.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A method comprising the steps of:

selecting a particular sub-menu using a first hierarchical multi-level menu-structure with entries corresponding to particular information items in a first subset of information items;

proceeding from the first particular sub-menu in the first menu-structure to a corresponding sub-menu in a second hierarchical multi-level menu-structure with entries corresponding to particular information items in a second subset of information items, including at least sub-menus corresponding to the sub-menus of the first menu-structure and the second subset including at least information items corresponding to information items of the first subset.

2. The method of claim 1, further comprising the step of returning from a particular sub-menu in the second menu-structure to the corresponding sub-menu in the first menu-structure.

3. The method of claim 1, further comprising the steps of: providing the first menu-structure residing on a local station; providing the second menu-structure residing on a central station; and connecting the local station with the central station.

4. The method of claim 3, in which connecting the local station to the central station includes connecting via an Internet.

5. The method of claim 1, further comprising the steps of: upon selecting the particular item from the second subset, determining whether the first subset contains an information item corresponding to the particular information item in the second subset; and if such information item is contained in the first subset, then accessing the corresponding information item in the first subset instead of the particular information item in the second subset.

6. The method of claim 1, further comprising the step of modifying the second menu-structure to include a further sub-menu and/or to include an updated information item.

7. The method of claim 1, further comprising initialization steps of retrieving start-up information external to the first menu-structure; and presenting the sub-menu according to the start-up information, to the user as the first sub-menu.

8. The method of claims 1, in which:
the method further comprises the step of returning from a particular sub-menu in the second menu-structure to a corresponding sub-menu in the first menu-structure;
the method further comprises of the steps of:
providing a first menu-structure residing on a local station; and providing the second menu-structure residing on a central station; and connecting the local station with the central station;
the connecting step includes connecting via the Internet;
the method further comprises the steps of: upon selecting the particular item from the second subset, determining whether the first subset contains a current version of the information item corresponding to the particular information item in the second subset; and if such corresponding information item is contained in the second subset, then accessing the corresponding information item in the first subset instead of the particular information item in the second subset;
the method further comprises the step of modifying the second menu-structure to include a further sub-menu and/or to include an updated information item;
the method further comprises initialization steps of: retrieving start-up information external to the first menu-structure; and presenting the sub-menu according to the start-up information to the user as the first sub-menu;
the second menu-structure includes at least the sub-menus of the first menu-structure; and the second subset includes at least the information items in the first subset; and
the method further comprises the step of loading programs into a more general purpose system to provide a system for this method for selecting particular information items.

9. A system comprising:
a first hierarchical multi-level menu-structure with entries corresponding to particular information items in a first subset of information items; and
a second hierarchical multi-level menu-structure with entries corresponding to particular information items in a second subset of information items; and
means for proceeding from a particular sub-menu in the first menu-structure to a corresponding sub-menu in the second menu-structure for selecting a particular information item from the second subset using the second menu-structure
wherein the second menu-structure contains at least sub-menus corresponding to the sub-menus of the first menu-structure and the second subset contains at least information items of the first subset.

10. The system of claim 9, further comprising: a local station containing the first menu-structure and the first subset of the information items; a central station containing the second menu-structure and the second subset of the information items; and means for connecting the local station to the central station.

11. The system of claim 9, further comprising means including a verification module for, upon selecting the particular item from the second subset by the user, determining whether the first subset contains an information item corresponding to the particular information item in the second subset and for, if such information item is contained in the first subset, accessing the corresponding information item in the first subset instead of the particular information item in the second subset.

12. The system of claim 9, further comprising means including a modification module for modifying the second menu-structure to include a further sub-menu and/or to include an updated information item.

13. The system of claim 9, in which:
the system further comprises: a local station containing the first menu-structure and the first subset of the information items; a central station containing the second menu-structure and the second subset of the information items; and means for connecting the local station to the central station;
the system further comprises verification means for, upon selecting the particular item from the second subset by the user, determining whether the first subset includes an information item corresponding to the particular information item in the second subset, and for, if such information item is contained in the first subset, accessing the corresponding information item in the first subset instead of the particular information item in the second subset;
the system further comprises modification means for modifying the second menu-structure to include a further sub-menu and/or to include an updated information item; the second menu-structure includes at least the sub-menus of the first menu-structure; and the second subset includes at least the information items in the first subset; and the system further comprises means to load programs into the system for converting a general purpose system into the system for selecting the information items.

14. A local station comprising:
- a local hierarchical multi-level menu-structure with entries corresponding to particular information items in a local subset of information items;
- means for proceeding from a particular sub-menu in the local menu-structure to a corresponding sub-menu in an external hierarchical multi-level menu-structure with entries corresponding to particular information items in an external subset of information items; and
- means for selecting a particular information item from the external subset of the information items using the external menu-structure,
- wherein the external menu-structure contains at least sub-menus corresponding to the sub-menus of the local menu-structure and the external subset contains at least information items of the local subset.

15. The local station of claim 14 further comprising means including a verification module for, upon selecting the particular item from the external subset by the user, determining whether the local subset contains an information item corresponding to the particular information item in the external subset and for, if such information item is contained in the local subset, accessing the corresponding information item in the local subset instead of the particular information item in the external subset.

16. The local station of claim 14, further comprising means to receive start-up information from an external source and to perform an initialization step for presenting a first sub-menu to the user on the basis of the start-up information so received.

17. The station of claim 14, in which:
- the local station further comprises verification means for, upon selecting a particular information item from the external subset by the user, determining whether the local subset includes a current version of the information item corresponding to the particular information item in the external subset, and for, if such current information item is contained in the local subset, accessing the corresponding information item in the local subset instead of the particular information item in the external subset;
- the local station further comprises means to receive start-up information from an external source upon initialization, and means for presenting a first sub-menu to the user upon the initialization, depending on the start-up information received upon the initialization;
- the external menu-structure includes at least the sub-menus of the local menu-structure; and the external subset includes at least the information items in the local subset and
- the station further comprises means to load executable programs to provide programmed apparatus for converting a general purpose computer into the local station.

18. An information carrier comprising an executable program to be loaded in an apparatus for providing in the apparatus programmed structures including:
- a local hierarchical multi-level menu-structure with entries corresponding to particular information items in a local subset of information items;
- means for proceeding from a particular sub-menu in the local menu-structure to a corresponding sub-menu in an external hierarchical multi-level menu-structure with entries corresponding to particular information items in an external subset of information items; and
- means for selecting a particular information item from the external subset of the information items using the external menu-structure,
- wherein the external menu-structure contains at least sub-menus corresponding to the sub-menus of the local menu-structure and the external subset contains at least information items of the local subset.

19. Apparatus to generate signals to program a system to implement a process comprising:
- selecting a particular sub-menu using a first hierarchical multi-level menu-structure with entries corresponding to particular information items in a first subset of information items;
- proceeding from the first sub-menu in the first menu-structure to a corresponding sub-menu in a second hierarchical multi-level menu-structure with entries corresponding to particular information items in a second subset of information items,
- wherein the second menu-structure contains at least sub-menus corresponding to sub-menus of the first menu-structure and the second subset of information items contains at least information items corresponding to all the information items of the first subset.

* * * * *